US008612098B2

(12) United States Patent
Fouilleul et al.

(10) Patent No.: US 8,612,098 B2
(45) Date of Patent: Dec. 17, 2013

(54) DRIVE ARRANGEMENT

(75) Inventors: Antoine Fouilleul, Saint-Leu la Foret (FR); Roger Darraba, Montesson (FR)

(73) Assignee: Autoliv Development AB, Vargada (SE)

( * ) Notice: Subject to any disclaimer, the term of this patent is extended or adjusted under 35 U.S.C. 154(b) by 15 days.

(21) Appl. No.: 13/231,165

(22) Filed: Sep. 13, 2011

(65) Prior Publication Data

US 2012/0098324 A1 Apr. 26, 2012

(30) Foreign Application Priority Data

Oct. 21, 2010 (EP) .................................... 10188383

(51) Int. Cl.
*B60R 21/0132* (2006.01)
*B60R 21/015* (2006.01)
*B60R 21/013* (2006.01)

(52) U.S. Cl.
USPC .............................................. 701/45; 701/46

(58) Field of Classification Search
USPC .......... 701/45; 280/806, 735, 801.1; 180/282, 180/268; 307/10.1; 340/644; 318/16, 280, 318/490; 297/477
See application file for complete search history.

(56) References Cited

U.S. PATENT DOCUMENTS 5,568,939 A * 10/1996 Blackburn et al. ............ 280/806
5,571,253 A * 11/1996 Blackburn et al. ............ 180/282
5,890,779 A * 4/1999 Blackburn et al. ........... 307/10.1
6,025,783 A * 2/2000 Steffens, Jr. .................. 340/644
6,142,524 A * 11/2000 Brown et al. ................. 280/806
6,155,601 A * 12/2000 Cantor et al. ................. 280/806
6,206,416 B1 * 3/2001 Faigle et al. .................. 280/735
6,369,529 B1 * 4/2002 McClintock et al. ........... 318/16
6,520,541 B1 * 2/2003 Cantor ....................... 280/801.1
6,550,810 B1 * 4/2003 Bauer et al. ................... 280/803
6,588,532 B1 * 7/2003 Adams et al. ................. 180/271
6,700,310 B2 * 3/2004 Maue et al. ................... 310/339
6,817,629 B2 * 11/2004 Herberg et al. ............ 280/801.1
6,916,045 B2 * 7/2005 Clancy et al. ................. 280/805
6,933,655 B2 * 8/2005 Morrison et al. ............. 310/314
7,341,216 B2 * 3/2008 Heckmayr .................... 242/374
7,343,999 B2 * 3/2008 Cuddihy et al. .............. 180/268
7,475,840 B2 * 1/2009 Heckmayr .................... 242/374
7,588,114 B2 * 9/2009 Cuddihy et al. .............. 180/268
8,063,591 B2 * 11/2011 Yamamoto .................... 318/280
2005/0284977 A1 * 12/2005 Specht et al. ................. 242/374
2009/0026828 A1 * 1/2009 Adomeit et al. .............. 297/477
2009/0284205 A1 * 11/2009 Yamamoto .................... 318/490

FOREIGN PATENT DOCUMENTS

EP 0 680 854 A2 3/1995
JP 2010-28878 4/2010

OTHER PUBLICATIONS

European Search Report—Apr. 6, 2011.

* cited by examiner

*Primary Examiner* — Thomas Black
*Assistant Examiner* — Robert Payne
(74) *Attorney, Agent, or Firm* — Brinks, Gilson & Lione

(57) ABSTRACT

A drive arrangement (1) for driving a motor (9) in a seat belt pre-tensioner incorporates a power supply circuit (6) in the form of an H bridge and a voltage boost circuit 16 which are controlled by a control unit (17). The control unit (17) controls the voltage boost circuit (16) to increase the voltage output to the motor (9) to speed up the rotation of the motor (9) whilst the motor (9) winds in slack in a seat belt (13).

15 Claims, 4 Drawing Sheets

DRIVE ARRANGEMENT

CROSS REFERENCE TO RELATED APPLICATIONS

This application claims priority to European Patent Application No. 10188383.3, filed Oct. 21, 2010.

TECHNICAL FIELD OF THE INVENTION

The present invention relates to a drive arrangement, and more particularly relates to a drive arrangement for driving a motor in a seat belt pre-tensioner.

BACKGROUND OF THE INVENTION

A seat belt pre-tensioner is installed in a vehicle to wind in slack in a seat belt which is being worn by an occupant of the vehicle in the event that there is an anticipated crash situation. The pre-tensioner pulls the seat belt tight against the occupant to minimize movement of the occupant relative to the seat belt if or when the crash situation occurs.

In most cases, a seat belt pre-tensioner is activated in response to a signal from a pre-crash sensor which detects that a crash situation may be about to occur. When the seat belt pre-tensioner is activated it is important that the pre-tensioner winds in the slack in the seat belt quickly so that the seat belt is tensioned correctly against the occupant, ready for the crash situation.

In some instances it may be necessary for a seat belt pre-tensioner to wind in a seat belt with sufficient force to re-position an occupant wearing the seat belt. For instance, it may be necessary for the pre-tensioner to wind in the seat belt with sufficient force so that the occupant is pulled back against the seat into a preferred sitting position. The occupant can thus be repositioned to be restrained in a safe manner by the seat belt during a crash situation.

Conventional seat belt pre-tensioners are usually powered by the main power supply in a vehicle which is normally a 12V battery. The current which can be supplied by a vehicle battery is unfortunately limited and the current limit can place undesirable constraints on the operation of a seat belt pre-tensioner. In some cases, the current limit prevents the motor in the seat belt pre-tensioner from rotating with sufficient speed to tension the seat belt quickly. In other cases, the current is not high enough to allow the motor to exert sufficient force on the seat belt to re-position an occupant.

It has been proposed previously to set the ratio of the gearing which links the pre-tensioner motor to the spool of the safety belt so that the motor rotates the spool with a sufficiently high speed. However, setting the gear ratio in this way lowers the force exerted on the seat belt which is undesirable. Alternatively, variable gear box arrangements have been proposed to provide a high-speed gear ratio during the wind-in phase and a lower-speed but higher torque gear ratio during an occupant re-positioning phase. However, variable gearbox arrangements are expensive and difficult to implement.

The present invention seeks to provide an improved drive arrangement.

SUMMARY OF THE INVENTION

According to one aspect of the present invention, there is provided a drive arrangement for driving a seat belt pre-tensioner, the arrangement comprising: a power supply circuit which is configured to receive power from a power supply, the power supply circuit incorporating: a first pair of switches connected in series with a first output provided therebetween, and a second pair of switches connected in series with a second output provided therebetween, the first and second outputs for connection to a motor in a seat belt pre-tensioner, a control unit connected to the switches to control the switches to output a voltage across the first and second outputs and a voltage boost circuit which, upon activation by the control unit, increases the voltage across the outputs to increase the speed of rotation of a motor connected to the outputs.

Preferably the voltage boost circuit comprises an inductor connected in series between the power supply and the power supply circuit.

Conveniently the voltage boost circuit incorporates a first boost switch.

Advantageously the first boost switch is connected in series between the inductor and the power supply circuit.

Preferably one end of each pair of switches in the power supply circuit is connected together and the first boost switch is connected in series with one of the connections between the pairs of switches.

Conveniently the voltage boost circuit incorporates a second boost switch which is controlled by the control unit to energize the inductor.

In one embodiment the second boost switch is connected in parallel with the power supply circuit.

In another embodiment the second boost switch is one of the switches in the power supply circuit.

Preferably a drive arrangement according to this invention may be configured to drive a motor in three phases of operation, with the control unit only activating the voltage boost circuit in one of the phases of operation.

Conveniently the control unit is configured to receive a signal from a pre-crash sensor.

Advantageously each switch is a transistor.

Preferably the arrangement incorporates a motor.

Conveniently the power supply circuit is an H bridge circuit.

According to another aspect of the present invention, there is provided a seat belt pre-tensioner comprising a motor connected to a drive arrangement as described hereinafter.

According to a further aspect of the present invention, there is provided a vehicle incorporating a seat belt pre-tensioner comprising a motor connected to a drive arrangement as described hereinafter.

So that the present invention may be more readily understood, embodiments of the present invention will now be described, by way of example, with reference to the accompanying drawings.

DETAILED DESCRIPTION OF THE DRAWINGS

Figure 1:
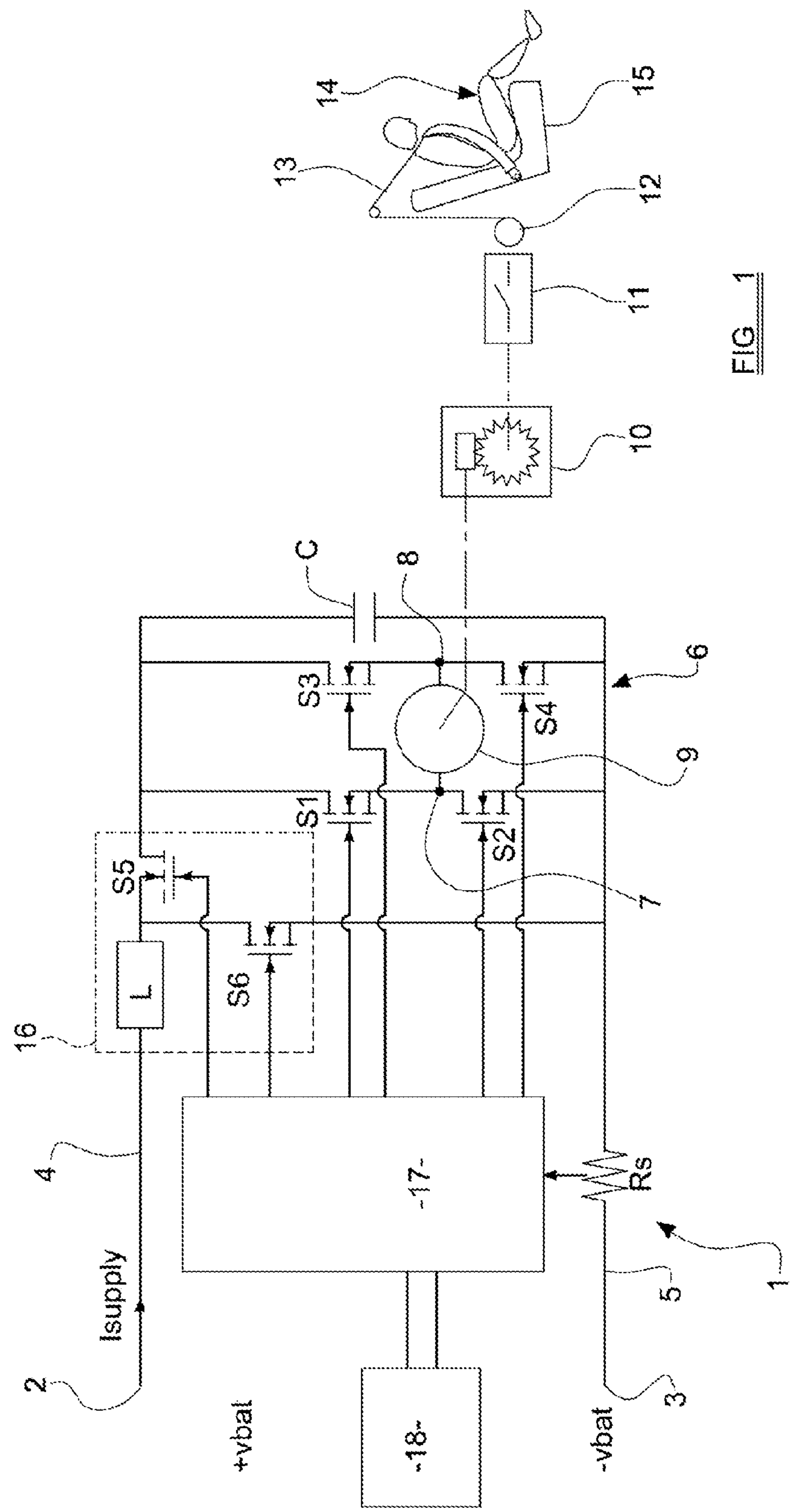
FIG. 1 is a schematic view of a drive arrangement comprising a voltage boost circuit in accordance with an embodiment of the invention, with the drive arrangement being connected to a seat belt pre-tensioner.

Referring initially to FIG. 1 of the accompanying drawings, a drive arrangement 1 in accordance with an embodiment of the present invention incorporates a positive voltage power supply input 2 (+ vbat) and a negative voltage power supply input 3 (– vbat) which are configured to be connected to a power supply in a motor vehicle (not shown). The power supply inputs 2 and 3 are connected to positive and negative voltage power rails 4 and 5 which deliver power to a power supply circuit which is in the form of an H bridge circuit 6.

The H bridge circuit 6 incorporates a first pair of switches S1 and S2 and a second pair of switches S3 and S4. The switches S1-S4 are preferably transistors (i.e. solid state switches). The first pair of switches S1 and S2 are connected with a first output 7 provided therebetween and the second pair of switches are connected with a second output 8 provided therebetween. The ends of each pair of switches S1 and S2 and S3 and S4 are connected together at the positive and negative voltage power rails 4 and 5. By selectively closing switches S1 and S4, or S2 and S3, the motor 8 can be energized to rotate in a forward (winding) or reverse (unwinding) direction.

The outputs 7 and 8 are configured to be connected to an electric motor 9 of a seat belt pre-tensioner. The motor 9 is preferably connected to drive a gearbox 10 which forms part of a seat belt retractor (not shown). The seat belt retractor preferably also incorporates a clutch 11 and a belt spool 12. A seat belt 13 extends from the belt spool 12 around an occupant 14 seated on a seat 15 in a motor vehicle.

The drive arrangement 1 incorporates a voltage boost circuit 16 which is connected in series between the positive voltage power supply input 2 and the H bridge circuit 6. The voltage boost circuit 16 incorporates an inductor L which is in series with the positive voltage rail 4. A first boost switch S5 is connected in series between the inductor L and the H bridge circuit 6.

The voltage boost circuit 16 incorporates a second boost switch S6 which is connected in parallel with the H bridge circuit 6, across the positive and negative voltage power rails 4 and 5. A capacitor C is preferably also connected in parallel across the positive and negative voltage rails 4 and 5.

The switches S1-S4 of the H bridge circuit 6 and the boost switches S5 and S6 of the voltage boost circuit 16 are connected to a control unit 17. In this embodiment, the switches S1-S6 are transistors and the gate of each transistor is connected to receive signals from the control unit 17 to switch the transistors on and off. A current shunt resistor Rs provides an input to the control unit 17 which is indicative of the current drawn by the motor 9.

The control unit 17 is connected to receive signals from a sensor 18 in the vehicle. The sensor 18 is preferably a pre-crash sensor which is configured to sense an anticipated crash situation and provide an activation signal to the control unit 17 in the event that there is an anticipated crash situation.

Figure 2A:
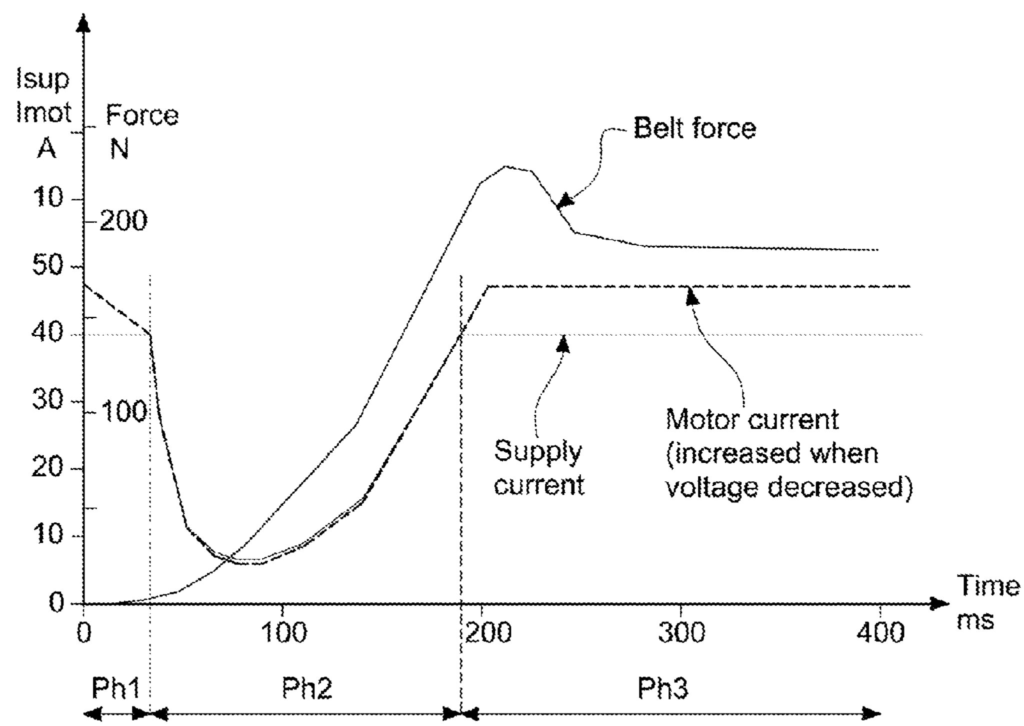
FIG. 2 is a graphical representation of three phases of operation of the drive arrangement shown in FIG. 1, without the voltage boost circuit being activated.
Figure 2B:
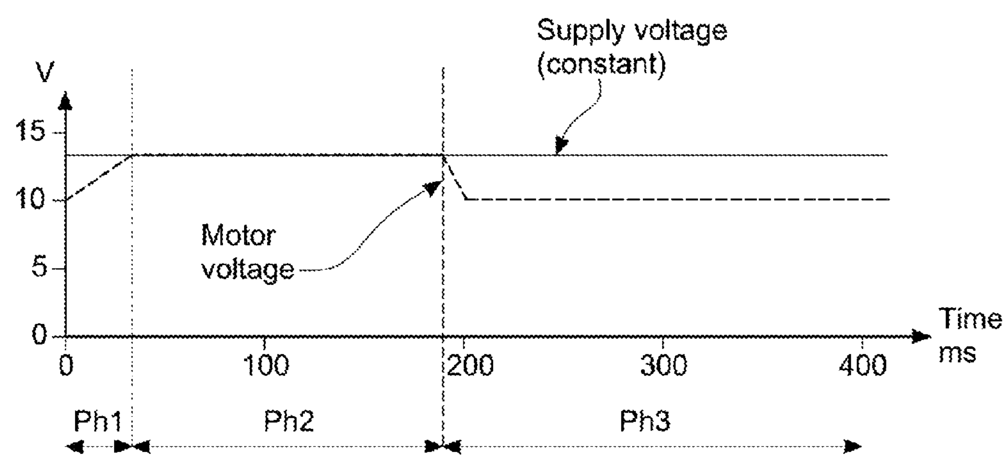

The following discussion refers to FIG. 2 and to a hypothetical situation in which the drive arrangement 1 drives a motor 9 without the voltage boost circuit 16 being activated. In this hypothetical example the first boost switch S5 is switched on continuously to connect the H bridge circuit 6 to the positive power voltage rail 4, but the second boost switch S6 is switched off so the power supply voltage is not boosted.

If the sensor 18 senses that a crash situation may be about to occur, the sensor 18 sends an activation signal to the control unit 17. Upon receipt of the activation signal, the control unit 17 activates the H bridge circuit 6 by switching the H bridge circuit switches S1 and S4 to apply power to the motor 9 so that the motor 9 winds in and tensions the seat belt 13. The control unit 17 limits the current supplied to the motor 9 by switching the H bridge switches S1 and S4 with pulse width modulation at approximately 20 KHz.

To tension the seat belt 13, the control unit 17 either turns switch S3 on continuously and modulates switches S1 and S2 with complementary switching, or the control unit 17 turns switch S2 on continuously and modulates switches S3 and S4 with complementary switching.

After the crash situation has occurred or if there is no longer an anticipated crash situation, the control unit 17 activates the H bridge circuit 6 to release the seat belt 13 by turning the motor 9 in the reverse direction. To release the seat belt 13, the control unit 17 either turns switch S1 on continuously and modulates switches S3 and S4 with complementary switching, or turns switch S4 on continuously and modulates switches S1 and S2 with complementary switching. The H bridge circuit 6 can thus be used to turn the motor 9 in the reverse direction to release the clutch 11.

Referring now to FIG. 2 of the accompanying drawings, the graphs 2*a* and 2*b* indicate that there are three phases of operation Ph1-Ph3 when the drive arrangement 1 is driving the motor 9 to tension the seat belt 13. In the first phase Ph1, the motor 9 starts to turn. The counter electromotive force of the motor 9 is low and so the voltage across the motor 9 is limited by the control unit 17 to limit the power drawn by the motor 9.

In the second phase of operation Ph2, the motor 9 is turning and the motor 9 winds in slack in the seat belt 13. During this second phase Ph2 the voltage across the motor is no longer reduced and the current supplied to the motor 9 dips to a low level.

When the motor 9 has wound the seat belt 13 so that there is no longer any slack in the seat belt 13, the motor 9 is blocked by the seat belt 13 from rotating and the arrangement operates in a third phase Ph3. In the third phase Ph3, there is no counter electromotive force and so the voltage across the motor 9 must be reduced in order to limit the power drawn by the motor 9.

Figure 3A:
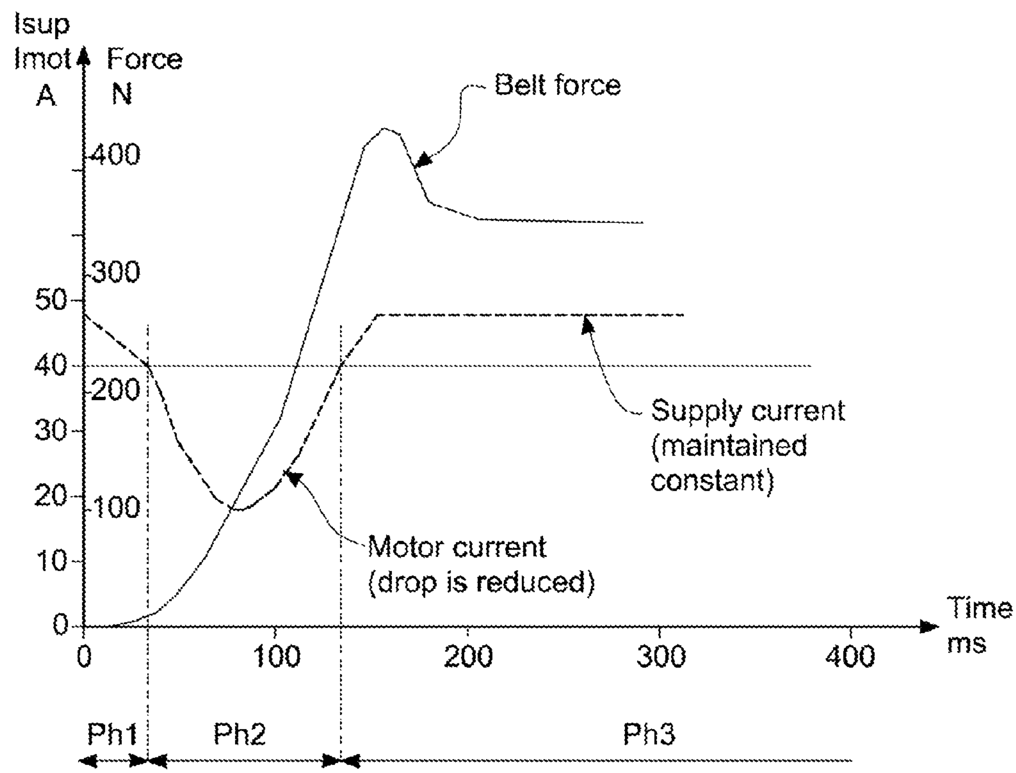
FIG. 3 is a graphical representation of three phases of operation of the drive arrangement shown in FIG. 1, with the voltage boost circuit being activated.
Figure 3B:
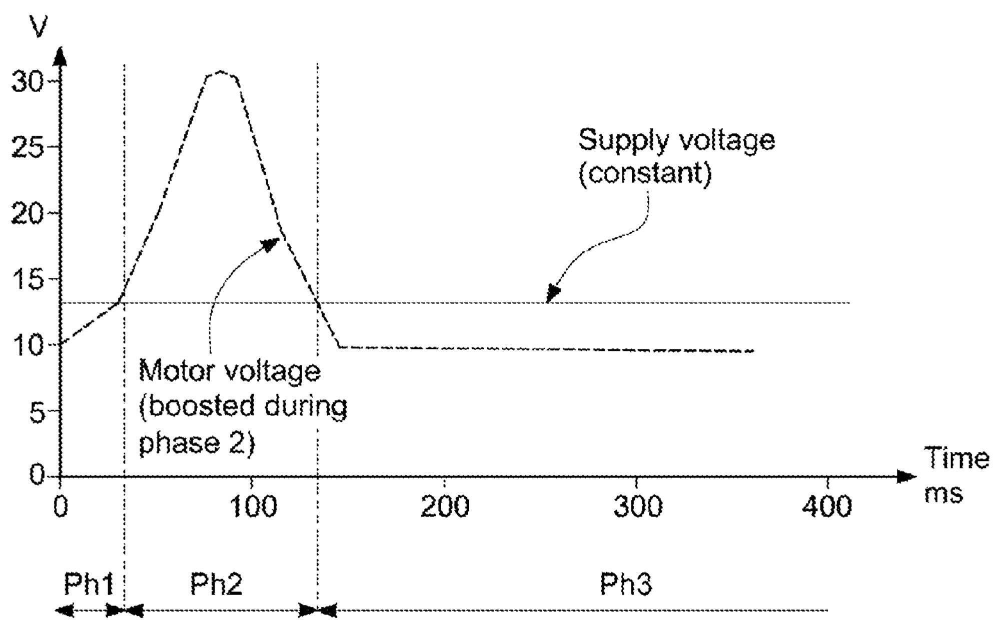

Referring now to FIG. 3 of the accompanying drawings, the three phases of operation of the drive arrangement 1 are illustrated, with the voltage boost circuit activated during the second phase Ph2. This is the way in which embodiments of the invention would operate in practice.

In a first phase of operation, either the first boost switch S5 and the switch S3 are turned on continuously and the switches S1 and S2 are modulated with complementary switching, or the first boost switch S5 and the switch S2 are turned on continuously and the switches S3 and S4 are modulated with complementary switching.

In the second phase of operation Ph2, the switches S2 and S3 are turned on continuously and the first and second boost switches S5, S6 are modulated with complementary switching to activate the voltage boost circuit 16. The voltage boost circuit 16 increases the voltage from the power supply and boosts the voltage across the H bridge switches S1-S4 and the capacitor C. The first boost switch S5 acts as a control diode in the voltage boost circuit 16.

Graphs 3*a* and 3*b* of FIG. 3 illustrate how the supply current is kept constant during the second phase Ph2 as a result of the motor voltage being boosted by the voltage boost circuit 16. It is clear from graph 3*b* that the motor voltage is now increased during the second phase Ph2 so the motor 9 can turn quickly to wind in the slack in the seat belt 13 rapidly. The speed of rotation of the motor 9 thus increases much faster compared with when the voltage boost circuit 16 is not activated. The motor 9 can therefore wind in the slack in the seat belt 13 quickly.

Since the voltage boost circuit 16 enables the motor 9 to rotate at a higher speed, the motor accumulates a higher rotational kinetic energy during the second phase Ph2. The higher rotational kinetic energy translates to an increased force exerted on the seat belt 13 during the third phase Ph3. This enables the seat belt 13 to exert a force of approximately 400N or higher on the occupant 14 which is high enough for the seat belt 13 to re-position the occupant 14.

Figure 4:
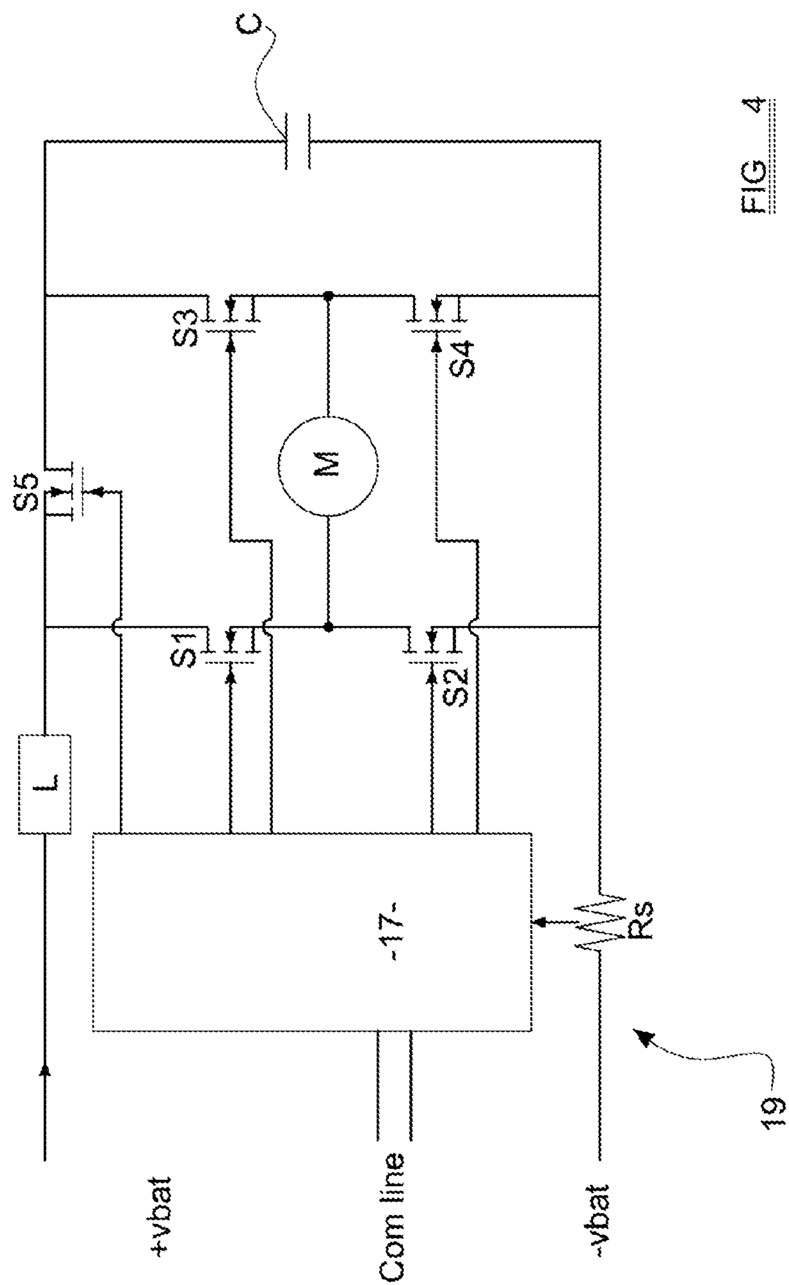
FIG. 4 is a schematic view of a drive arrangement in accordance with another embodiment of the present invention.

Referring now to FIG. 4 of the accompanying drawings, a drive arrangement 19 in accordance with a further embodiment of the invention is identical in many ways to the drive arrangement 1 described above. The only exception is that in this further embodiment the second boost switch S6 of the voltage boost circuit 16 is omitted and the first boost switch S5 is in series with the connection between the pairs of switches S1 and S2 and S3 and S4 in the H bridge circuit 6.

The voltage boost circuit 16 is thus partly combined with the H bridge circuit 6, with the function of the second boost switch S6 being carried out by one of the switches S1-S4 in the H bridge circuit 6. The drive arrangement 19 therefore incorporates a voltage boost circuit but with only one extra voltage boost switch required in addition to the H bridge switches S1-S4.

During the first phase of operation Ph1, either the voltage boost switch S5 and the switch S3 are turned on continuously and the switches S1 and S2 are modulated with complementary switching, or the voltage boost switch S5 and the switch S2 are turned on continuously and the switches S3 and S4 are modulated with complementary switching.

In the second phase of operation Ph2, switches S2 and S3 are turned on continuously and switches S1 and S5 are modulated with complementary switching to boost the voltage across the second pair of switches S3, S4 and the capacitor C.

To turn the motor 9 in the reverse direction, either the voltage boost switch S5 and the switch S1 are turned on continuously and switches S3 and S4 are modulated with complementary switching, or the voltage boost switch S5 and the switch S4 are turned on continuously and the switches S1 and S2 are modulated with complementary switching.

The drive arrangement 19 of this further embodiment provides the same benefits as those discussed above but with reduced complexity compared with the drive arrangement 1 shown in FIG. 1 due to the omission of one switch from the voltage boost circuit. The drive arrangement 19 of this further embodiment is thus cheaper to implement and more efficient to operate.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A drive arrangement for driving a seat belt pre-tensioner having an electric motor, the arrangement comprising:

a power supply circuit which is configured to receive power from a power supply providing a positive voltage supply input, the power supply circuit incorporating:

a first pair of switches (S1 and S2) having a first switch (S1) and a second switch (S2), the first pair of switches connected with a first output provided therebetween and with the first switch (S1) connected with the positive voltage supply input and the second switch (S2) connected with the negative voltage supply input.

a second pair of switches (S3 and S4) having a third switch (S3) and a fourth switch (S4), the second pair of switches connected with a second output provided therebetween with the third switch (S3) connected with the positive voltage supply input and the fourth switch (S4) connected with the negative voltage supply input, the first and second outputs being configured to be connected to the motor in a seat belt pre-tensioner;

a control unit connected to the first, second, third, and fourth switches (S1, S2, S3, and S4) to control the first, second, third, and fourth switches to output a voltage across the first and second outputs; and a voltage boost circuit which, upon activation by the control unit, increases the voltage across the switches (S1-S4), which increases the voltage across the outputs (7,8) to increase the speed of rotation of a motor (9) connected to the outputs (7,8);

wherein the drive arrangement is configured to drive the motor in at least two phases of operation, with the control unit only activating the voltage boost circuit in one of the at least two phases of operation.

2. A drive arrangement according to claim 1, further comprising that the voltage boost circuit includes an inductor connected in series between the power supply and the power supply circuit.

3. A drive arrangement according to claim 2, further comprising that the voltage boost circuit incorporates a first boost switch (S5).

4. A drive arrangement according to claim 3, further comprising that the first boost switch (S5) is connected in series between the inductor and the power supply circuit.

5. A drive arrangement according to claim 3, further comprising that the first pair of switches (S1 and S2) and the second pair of switches (S3 and S4) are connected with the first boost switch (S5) arranged in a connection between the pairs of switches.

6. A drive arrangement according to claim 1, further comprising that the voltage boost circuit incorporates a second boost switch (S6) controlled by the control unit to energize the inductor.

7. A drive arrangement for driving a seat belt pre-tensioner having an electric motor, the arrangement comprising:

a power supply circuit which is configured to receive power from a power supply providing a positive voltage supply input, the power supply circuit incorporating:

a first pair of switches (S1 and S2) having a first switch (S1) and a second switch (S2), the first pair of switches connected with a first output provided therebetween and with the first switch (S1) connected with the positive voltage supply input and the second switch (S2) connected with the negative voltage supply input;

a second pair of switches (S3 and S4) having a third switch (S3) and a fourth switch (S4), the second pair of switches connected with a second output provided therebetween with the third switch (S3) connected with the positive voltage supply input and the fourth switch (S4) connected with the negative voltage supply input, the first and second outputs being configured to be connected to the motor in a seat belt pre-tensioner;

a control unit connected to the first, second, third, and fourth switches (S1, S2, S3, and S4) to control the first, second, third, and fourth switches to output a voltage across the first and second outputs; and a voltage boost circuit which, upon activation by the control unit, increases the voltage across the outputs wherein the voltage boost circuit incorporates a second boost switch (S6) controlled by the control unit to energize the inductor wherein the second boost switch (S6) is connected in parallel with the power supply circuit.

8. A drive arrangement according to claim 6, wherein the second boost switch (S6) is one of the switches (S1, S2, S3, or S4) in the power supply circuit.

9. A drive arrangement according to claim 1, wherein the drive arrangement is configured to drive the motor in three phases of operation, with the control unit only activating the voltage boost circuit in one of the phases of operation.

10. A drive arrangement according to claim 1, wherein the control unit is configured to receive a signal from a pre-crash sensor.

11. A drive arrangement according to claim 1, wherein each switch of the first or second pairs of switches is a transistor.

12. A drive arrangement according to claim 1, further comprising the motor.

13. A drive arrangement according to claim 1, wherein the power supply circuit is an H bridge circuit.

14. A seat belt pre-tensioner comprising the motor connected to the drive arrangement according to claim 1.

15. A vehicle incorporating a seat belt pre-tensioner comprising the motor connected to a drive arrangement according to claim 1.

* * * * *